E. F. HARRINGTON.
CORK CUTTING MACHINE.

No. 101,730.  Patented Apr. 12, 1870.

Witnesses:
Herbert S. Whitman
H. K. Porter

Inventor:
Edward F. Harrington
By T. W. Porter Atty

United States Patent Office.

EDWARD F. HARRINGTON, OF BOSTON, MASSACHUSETTS, ASSIGNOR TO HIMSELF AND JOHN I. MUNROE, OF WOBURN, MASSACHUSETTS.

*Lettees Patent No. 101,730, dated April 12, 1870.*

IMPROVEMENT IN CORK-CUTTING MACHINES.

The Schedule referred to in these Letters Patent and making part of the same.

*To all whom it may concern:*

Be it known that I, EDWARD F. HARRRINGTON, of Boston, in the county of Suffolk and State of Massachusetts, have invented a new and useful Cork-Cutting Machine; and I do hereby declare that the following, taken in connection with the drawings which accompany and form part of this specification, is a description of my invention sufficient to enable those skilled in the art to which it appertains to practice it.

This invention relates to new and useful improvements in machines used for cutting corks in cylindrical form; and The improvements consist mainly in the arrangement of the cutting-blades, the mechanism by which the cork blanks are held, rotated, and presented to the cutting-blades, the means of adjustment of the forogoing mechanism for cutting corks, either large or small, short or long, straight or tapering, and the automatic devices for sharpening the cutting-blades, as will be hereinafter more fully described.

Figure 1:
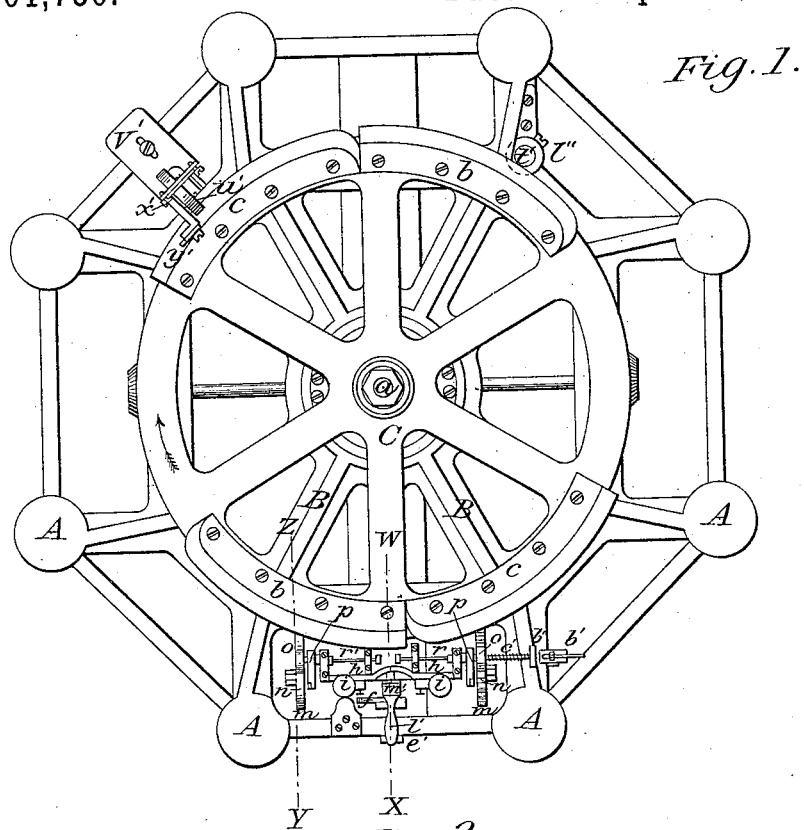
Figure 2:
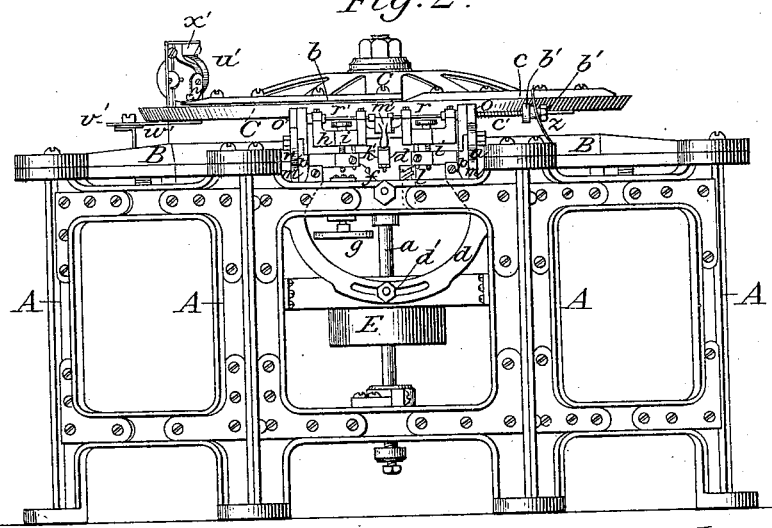

Figure 1 is a top or plan view of the machine;
Figure 2 is a front elevation;
Figure 3 is a top or plan view of the method of imparting motion to the holding and rotating devices;
Figure 4 is a detached side elevation taken on line $y\,z$, fig. 1;
Figure 5 is a detached end view of the locking and detaching-cam;
Figure 6 is a detached vertical section taken on line $w\,x$, fig. 1;
Figure 7 is a detached longitudinal vertical section showing the journaling of the sliding arbor; and
Figure 8 is a cross-section of the same.

Similar letters of reference indicate like parts in the several figures.

In the drawings—

A A A A represents the frame, which I usually construct eight sided, as shown in fig. 1.

B B is a top, formed as shown in fig. 1, and which is secured to frame A.

C is a wheel which is secured upon vertical shaft $a$, and revolves therewith, motion being imparted thereto by means of a belt upon pulley E, secured upon shaft $a$, or by means of a gear-wheel in place of the pulley.

$b\,c$ are segmentary cutting-blades secured to the upper side of wheel C, as shown.

It will be seen that there are two sets or pairs of blades placed upon opposite sides of wheel C, and also that the blades $c$ are so placed that their cutting-edge is slightly below that of blades $b$, the reason of which will be hereinafter explained.

$d\,d$ is a rocking frame, which is pivoted upon stud $e$, as shown in figs 2 and 6, a lock-nut, $d'$, upon a stud in the slot at the lower part of frame $d\,d$, holding the frame in any desired position.

$h\,h$ is a supplemental or upper frame attached to frame $d\,d$ by steady-pins, and the elevating-screws $i\,i$, as shown.

For the purpose of rocking or vibrating these frames upon their pivot $e$, a segment of a tangent-wheel, $f$, shown in figs. 2, and 6, is secured upon a hub formed upon $d\,d$, and through which passes stud $e$, while and endless screw secured upon the short vertical shaft extending upward from hand-wheel $g$, and meshing into gear $f$, serves, as the hand-wheel is rotated, to elevate or depress the segment, and thereby actuates the frames $d$ and $h$.

A small shaft $k$, shown in figs. 3, 4, 5, and 6, is held in bearings in the frame $d\,d$, parallel to and behind the upper part of frame A A.

Near the center of this shaft is secured a bevel-gear, $l$, shown in figs. 2 and 3.

This gear engages with a similar gear on shaft D, upon the inner end of which is another bevel-gear, which engages with a bevel-gear secured upon vertical shaft $a$ just beneath top B B, the relative positions of these parts being shown in fig. 3.

Thus, the rotary motion of vertical shaft $a$ is, through the agency of shaft D and the described gears, communicated to shaft $k$, giving it a constant rotary motion.

Two small arbors, $r$ and $r'$, are fitted to revolve in bearings in frame $h\,h$, as is plainly shown in fig. 2.

Two pairs of links or arms P P, also shown in fig. 2, are pivoted together at one end, while the upper and lower ends are fitted loosely upon shaft $k$, and arbors $r$ and $r'$ respectively.

Upon each pivot which unites the links is loosely fitted a small gear-wheel, $n$, shown in figs. 2 and 4.

These gears mesh each into a smaller gear, $o$, secured respectively upon arbors $r$ and $r'$ and into larger gears $m$ loosely fitted upon shaft $k$.

The object of thus connecting the gears $m\,n\,o$, and also rigidly securing the gears $o$ to their arbors while the others revolve freely, is to impart to the arbors $r$ and $r'$ an intermitting rotary motion, which is accomplished by means of devices which I will now explain.

I rigidly secure centrally upon gears $m$, two cams as shown at $x$, figs. 4 and 5.

These cams have each three recesses or catches shown at $s\,s\,s$.

Upon shaft $k$, next to cam $x$, is rigidly secured a short arm, $t$, at the outer end of which is pivoted the lever $u$, while a pin, $v$, passes through the opposite end of the lever, extending a short distance upon each side.

On one side of the lever the arm of a coiled spring,

*w*, bears upon the pin, forcing it upon cam *x* on the opposite side from the spring.

Now, if motion be imparted to shaft *k* through the agencies before described, the arms *t* will be rotated with the shaft, and the pin *v*, as it moves around the periphery of cam *x*, catches in one of its notches *s*, when the cam and gear, *m* will be rotated until the releasing cam *x''*, secured to frame *d d*, and in which the shaft *k* rotates, lifts pin *v* out of the seat in ratchet *x*, when the rotation of gear *m* ceases, until pin *v* again catches in another tooth of ratchet *x*, when the rotary motion of gear *m* is repeated, and, through the agency of gears *m n o*, this alternating motion is communicated to arbors *r* and *r'*.

Upon the right-hand end of shaft *k* is fixed a cam, *y*, as shown in fig. 5, against which bears a small roller in the lower end of lever *z*, which latter is pivoted at *a'*, and extends upward as a spring, as shown in fig. 2, and, being slotted, the arbor *r* passes through it, and the adjusting screw-nuts *b b'*, upon each side of the spring, furnish the means of adjustment for the purpose hereinafter explained, while a small coiled spring, *c'*, placed upon the arbor between the inner nut and the gear *o*, serves to constantly press the roller in the lower end of lever *z* against cam *y*.

*f* is a short rock-shaft in bearings formed upon the inside of frame *d*, as shown in fig. 6.

A short lever, *g'*, secured upon this shaft, depends as shown, so that a cam, *h'*, secured upon shaft *k*, throws this lever outward at each revolution of shaft *k*.

A second lever, *i'*, is also secured upon shaft *f*, and extends out through the space between frames *d* and *h*, as shown at fig. 6.

The outer end of this lever is formed with a vertical socket, in which is inserted the stem of plate *k'*, this stem being provided with screw-nuts above and below the socket, for the purpose of raising or lowering plate *k'* to any desired position.

The blank-carrier *l'* is fitted with dovetail joints, to slide back and forth upon the oblique plate *k'*, and is locked by a set-screw at any desired point.

The practical use and operation of the hereinbefore described parts is as follows:

The operator, standing in front of the machine, is provided with the blanks, which are the pieces of cork as cut from the wood and ready to be rounded, and the machine being in motion, he will, with one hand, place a blank in the seat *m'*, holding the handle *l'* with the fingers, and the blank with thumb of the other hand, when as shaft *k* is revolved, the cam *h'*, acting upon lever *g'* as before described, elevates the carrier, thereby bringing the blank between the inner ends of arbors *r* and *r'*, which, being fitted with suitable holders, grasp and hold the blank through the action of cam *y* upon lever *z*, as described, which forces arbor *r*, provided with end play, against the blank, forcing it against the arbor *r'* where it is held.

At the instant when the blank is thus held between the arbors *r* and *r'*, cam *h'* passes lever *g'*, releasing the blank-carrier, and allowing it to recede from the arbors, ready for another blank.

The rotary movement of shaft *k* also at the same instant brings the pin *v* in contact with cam *x*, thereby imparting a rotary movement to gears *m*, and, through gears *n* to *o*, rotating the blank toward the cutting-blades, the entire movement being so timed that the rotation of the blank begins just as the head of the blade *b* has nearly passed the length of the blank, and, as the latter makes a revolution while the blade is passing, therefore the blade will take a shaving from the four corners of the blank, leaving it round or nearly so, when the blade *c*, which, as before described and shown, is set slightly lower than blade *b* which precedes it, will cut a thin shaving from the nearly rounded cork, leaving it smooth and perfect, the rotation of the cork being also timed for the blades *c*.

Whilst one pair of the blades are thus cutting a cork, the operator places a blank in the carrier, as before stated, which is automatically placed between the holders in time for the next pair of blades, and, by increasing the number of blank-holders, with the corresponding parts, which may be placed either upon opposite sides of the frame, or upon four equidistant sides, the amount of work performed by the blades may be accordingly increased.

The advantage of an intermitting rotary motion of the arbors *r* and *r'* is that the blank is grasped with the full pressure between the ends of these arbors before the cutting-blades come in contact with it, and, by being thus first firmly grasped, the operator is always enabled to present the freshly-cut side of the blank to the blade, which entering the blank passes around it beneath the hardened surface, or "bark," as it is termed, which would soon destroy the edge of the knife.

The method of adjustment for cutting large or small corks is by raising or lowering frames *h h* by means of set-screws *i i*, as before explained, the pivoted links *p p* serving to keep the intermediate gears *u n* always meshed with the gears *m m* and *o o*, so that, whether frame *h h* be depressed for cutting large corks or elevated for cutting small ones, the motion of arbors *r* and *r'* is always the same, and, by means of the before-described vertical adjustment of stem *k'*, and the lateral adjustment of carrier *l'*, any size of blank may be centrally presented between the arbors *r* and *r'*, while the coiled spring *c'* throws back arbor *r*, and allows the cork to drop as soon as the pressure of cam *y* is removed from lever *z*, or as soon as the blade *c* has passed the cork.

By means of hand-wheel *g*, and the worm-gear upon its shaft, acting upon tangent wheel *f*, the frames *d d* and *h h* are rocked upon their pivot *e*, as before described, so as to bring arbors *r* and *r'* either parallel with the cutting-blades, or at any desired angle thereto, for the purpose of cutting corks either straight or tapering.

By means of the screw-nuts *b' b'*, between which is lever *z*, the position of arbor *r* is adjusted relatively to arbor *r'*, for the purposes of cutting corks of varying length.

I employ the devices shown in figs. 7 and 8 for the purposes of allowing to arbor *r* a sliding motion, while it has also a positive rotary motion, and to prevent wear upon the arbor by its rotary motion, which, being nearly at one point, would soon destroy it.

In these figures, *h* represents the part of the upper frame, through which the arbor passes. *n'* is a bushing which is fitted to revolve in *h*. In this bushing is a short pin, spline or stud *o'*, which fits into a longitudinal groove, *p'*. In the arbor *s' s'* are two shields, secured to *h*, as shown, and having holes the size of the arbor, which slides through them while they hold the bushing *n'* from end motion; therefore, while the arbor has an end motion upon its own surface, yet its rotation causes it no wear, as the bushing, revolving with it, receives all such wear, and the shaft is not worn at the point where it revolves in its bearings.

The gear *o* upon arbor *r*, being rigidly attached to a similar bushing, through which the arbor passes and slides but can not rotate, imparts rotary motion to the arbor.

For the purpose of sharpening the cutting-blades when in motion, I employ the following devices:

A small corundum or other suitable grit-wheel, *t'*, fig. 1, is cemented to a larger cork or other suitable wheel *t''*, which is mounted upon a pivot to revolve freely. The edge of the lower wheel bearing against the edge of wheel C, causes wheel t' to revolve, and thereby the grit-wheel acts uniformly upon the under side of the lower blades c, keeping them sharpened.

I also employ a grit-wheel, u', to act upon the upper side of the blades. This wheel is mounted on an arbor in a small sliding frame x', which slides upon the vertical part of bracket v', this bracket being secured to frame A by means of an upright, w'.

An adjustable arm or gauge, y', attached to frame x', slides on the upper blades and prevents the wheel from touching them, but the lower blades being somewhat thinner, the wheel is allowed to strike on the top of the edge, while a set-screw acting upon the under side of frame x', graduates the cut of this wheel in order to not wear the knives away faster than is necessary.

Having thus described my invention,

What I claim as new, and desire to secure by Letters Patent, is—

1. The arrangement of blades b c upon revolving disk C, to move in different horizontal lines, substantially in manner as and for the purposes specified.

2. The combination of the rocking frame d d, the adjustable frame h h, links p p, and gears m n o, substantially in manner and for the purposes specified.

3. The arrangement of the face-sharpening wheel t', and the grinding-wheel u' provided with automatic vertical adjustment and the gauge g', substantially as and for the purposes specified.

4. The combination of cam x, with its three equidistant stops s, let off cam x'', arms t, lever w, spring u, and pin v, or their equivalents, substantially as and for the purposes specified.

5. The pivoted frame d d, in combination with the rotary knives b c, when constructed, arranged, and operating in the manner and for the purposes specified.

E. F. HARRINGTON.

Witnesses:
EBEN HUTCHINSON,
HENRY HYDE SMITH.